(12) United States Patent
Besehanic

(10) Patent No.: US 12,177,105 B2
(45) Date of Patent: *Dec. 24, 2024

(54) METHODS AND APPARATUS TO PREDICT END OF STREAMING MEDIA USING A PREDICTION MODEL

(71) Applicant: The Nielsen Company (US), LLC, New York, NY (US)

(72) Inventor: Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/452,877

(22) Filed: Aug. 21, 2023

(65) Prior Publication Data

US 2024/0146635 A1    May 2, 2024

Related U.S. Application Data

(63) Continuation of application No. 18/158,458, filed on Jan. 23, 2023, now Pat. No. 11,765,061, which is a continuation of application No. 17/726,348, filed on Apr. 21, 2022, now Pat. No. 11,563,664, which is a continuation of application No. 17/189,145, filed on Mar. 1, 2021, now Pat. No. 11,316,769, which is a continuation of application No. 16/773,785, filed on Jan. 27, 2020, now Pat. No. 10,938,704, which is a
(Continued)

(51) Int. Cl.
| | |
|---|---|
| H04L 43/106 | (2022.01) |
| H04L 41/147 | (2022.01) |
| H04L 43/0894 | (2022.01) |
| H04L 47/83 | (2022.01) |
| H04L 65/60 | (2022.01) |
| H04L 65/612 | (2022.01) |
| H04N 21/24 | (2011.01) |
| H04N 21/845 | (2011.01) |

(52) U.S. Cl.
CPC .......... *H04L 43/106* (2013.01); *H04L 41/147* (2013.01); *H04L 43/0894* (2013.01); *H04L 47/83* (2022.05); *H04L 65/60* (2013.01); *H04L 65/612* (2022.05); *H04N 21/2402* (2013.01); *H04N 21/8456* (2013.01)

(58) Field of Classification Search
CPC . H04L 43/106; H04L 41/147; H04L 43/0894; H04L 47/823; H04L 65/60; H04L 65/612; H04L 47/83; H04N 21/2402; H04N 21/8456
See application file for complete search history.

(56) References Cited

U.S. PATENT DOCUMENTS

| | | | |
|---|---|---|---|
| 7,391,780 B1 * | 6/2008 | Stone | H04L 41/0896 370/252 |
| 2004/0146006 A1 * | 7/2004 | Jackson | H04L 47/29 370/468 |

(Continued)

*Primary Examiner* — Javier O Guzman

(57) ABSTRACT

Methods to predict end of streaming media using a prediction model are disclosed herein. An example apparatus includes at least one memory, instructions in the apparatus, and processor circuitry to execute the instructions to generate a prediction model using a mean value of a bandwidth of a transmission of a streaming media to a user device and an amplitude of the streaming media, and identify an end of a streaming media session when an output of the prediction model satisfies a threshold.

20 Claims, 10 Drawing Sheets

Related U.S. Application Data continuation of application No. 16/236,318, filed on Dec. 28, 2018, now Pat. No. 10,547,534, which is a continuation of application No. 15/954,552, filed on Apr. 16, 2018, now Pat. No. 10,193,785, which is a continuation of application No. 14/473,602, filed on Aug. 29, 2014, now Pat. No. 9,948,539.

(56) References Cited

U.S. PATENT DOCUMENTS

| | | | | |
|---|---|---|---|---|
| 2005/0080872 A1* | 4/2005 | Davis | H04L 69/329 | 714/E11.197 |
| 2006/0103437 A1* | 5/2006 | Kang | H03K 17/223 | 327/143 |
| 2008/0192820 A1* | 8/2008 | Brooks | H04N 21/2385 | 348/E7.071 |
| 2009/0249222 A1* | 10/2009 | Schmidt | H04N 21/4143 | 713/400 |
| 2010/0198943 A1* | 8/2010 | Harrang | H04L 65/80 | 709/224 |
| 2011/0078324 A1* | 3/2011 | Honma | H04N 21/42661 | 709/231 |
| 2013/0005296 A1* | 1/2013 | Papakostas | H04W 24/00 | 455/405 |
| 2013/0155866 A1* | 6/2013 | Sun | H04L 65/765 | 704/500 |
| 2013/0155882 A1* | 6/2013 | Pendleton | H04L 43/0882 | 370/252 |
| 2013/0326024 A1* | 12/2013 | Chen | H04L 65/65 | 709/219 |
| 2014/0169192 A1* | 6/2014 | Zhang | H04W 24/08 | 370/252 |
| 2015/0113156 A1* | 4/2015 | Smith | H04L 47/83 | 709/231 |

* cited by examiner

METHODS AND APPARATUS TO PREDICT END OF STREAMING MEDIA USING A PREDICTION MODEL

CROSS-REFERENCE TO RELATED APPLICATIONS

This patent is a continuation of U.S. patent application Ser. No. 18/158,458, filed Jan. 23, 2023, now U.S. Pat. No. 11,765,061, which is a continuation of U.S. patent application Ser. No. 17/726,348, filed on Apr. 21, 2022, now U.S. Pat. No. 11,563,664, which is a continuation of U.S. patent application Ser. No. 17/189,145, filed on Mar. 1, 2021, now U.S. Pat. No. 11,316,769, which is a continuation of U.S. patent application Ser. No. 16/773,785, filed on Jan. 27, 2020, now U.S. Pat. No. 10,938,704, which is a continuation of U.S. patent application Ser. No. 16/236,318, filed on Dec. 28, 2018, now U.S. Pat. No. 10,547,534, which is a continuation of U.S. patent application Ser. No. 15/954,552, filed on Apr. 16, 2018, now U.S. Pat. No. 10,193,785, which is a continuation of U.S. patent application Ser. No. 14/473,602, filed on Aug. 29, 2014, now U.S. Pat. No. 9,948,539. Priority to U.S. patent application Ser. Nos. 18/158,458; 17/726,348; 17/189,145; 16/773,785; 16/236,318; 15/954,552; and 14/473,602 is hereby claimed. U.S. patent application Ser. Nos. 18/158,458; 17/726,348; 17/189,145; 16/773,785; 16/236,318; 15/954,552; and 14/473,602 are hereby incorporated herein by reference in their entireties.

FIELD OF THE DISCLOSURE

This disclosure relates generally to monitoring streaming media, and, more particularly, to methods and apparatus to predict the end of streaming media using a prediction model.

BACKGROUND

Streaming media, as used herein, refers to media that is presented to a user by a presentation device at least partially in parallel with the media being transmitted (e.g., via a network) to the presentation device (or a device associated with the presentation device) from a media provider. Often times, streaming media is used to present live events. However, streaming media may also be used for non-live events (e.g., a time-shifted media presentation and/or video on demand presentation). Typically, time-adjacent portions of a streaming media file are delivered to and stored in a buffer, or temporary memory cache, of a streaming media device while the streaming media is presented to the user. The buffer releases the stored streaming media for presentation while continuing to fill with un-played portions of the streaming media. This process continues until the user terminates presentation of the streaming media and/or the complete streaming media file has been delivered (e.g., downloaded). In situations where the complete streaming media file has been delivered, the streaming media device typically continues releasing the buffered streaming media for presentation until the buffer is emptied.

A buffer is utilized to compensate for issues such as bandwidth usage fluctuations, which create "lag," or discontinuous delivery of the media. The buffer mitigates the occurrences of "lag" by holding a portion of the streaming media that can be presented while awaiting the transfer of additional streaming media. In some instances, as the buffer fills, the download speed (e.g., bandwidth usage rate) of the streaming media may speed up or slow down according to the remaining space of the buffer.

In recent years, streaming media has become a popular medium for the delivery of media to users. Services like Netflix™ and Amazon Instant Video™, as well as on-demand services provided by internet protocol (IP) based television services (e.g., AT&T Uverse™) are examples of providers of such streaming media. The instant nature of streaming media and the increase in bandwidth capabilities of internet service providers have contributed to the popularity of streaming media because of the high resolutions capable of being streamed (which require increased bandwidth for delivery). For example, when a user of a streaming media device selects a movie from a streaming media distributor, such as Netflix™, the movie the presented almost instantly without having to wait for the entire move file to be downloaded to the user's device.

DETAILED DESCRIPTION

Figure 1:
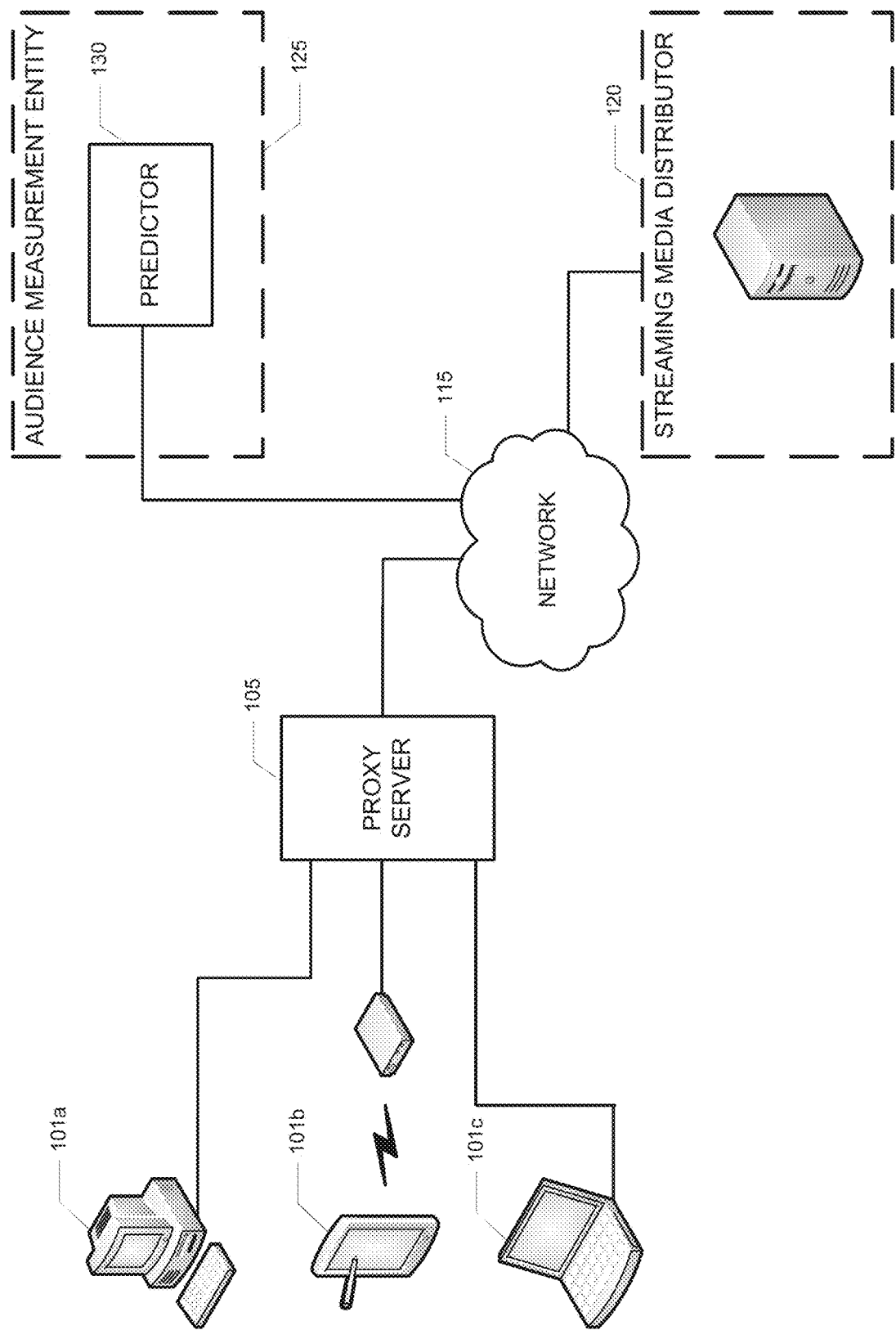
FIG. 1 is a block diagram of an example system for streaming media to user devices.

While a media device is streaming media from a streaming media distributor, data may be obtained from communications between the streaming media device and the streaming media distributor. Such data may be obtained by analyzing traffic patterns, analyzing communication packets, network tapping, etc. Example data (or metadata) about the streaming media and/or the streaming environment includes a media file format, an available buffer space of the streaming media device, bandwidth usage of the streaming media device, etc. This descriptive data may be used to compliment traditional data obtained by AMEs (e.g., audience composition and/or media identification associated with traditional media (e.g., radio and/or television) broadcasts) to create more robust data sets, and allows for finer grained statistical methods to be applied.

Predicting the end of the streaming media is important in instances where access to the streaming media distributor and/or the streaming media application is not available for directly obtaining information about the end. For example, predicting an end of streaming media time may allow for more precise streaming advertisement extraction for media crediting. In some instances, predicting the end of streaming media may allow for targeted survey delivery. That is, it allows a survey to be delivered near the end (e.g., slightly before the end) of the streaming media before a user diverts attention away from a media presentation device when the media presentation has ended.

In some instances, in media monitoring, time durations for streaming media presentation are elongated or shortened from a time duration of the streaming media. For example, by rewinding, skipping, or fast-forwarding (e.g., track mode operations) through streaming media (e.g., via progress bar manipulation), the duration of the presentation may be substantially longer or shorter than the duration of the streaming media (e.g., were it applied without any track mode operations). By extrapolating or inferring an end of streaming media (and updating the analysis during presentations), finer detailed and/or more accurate time durations may be obtained. Additionally or alternatively, targeted media may be provided to a user streaming media. Instead of waiting for a signal that streaming media is ended at a user device, it may be beneficial to predict when streaming media will end. By predicting the end time, a more seamless transition to targeted media may occur.

Examples disclosed herein predict the end of a streaming media presentation using a prediction model based on characteristics of the bandwidth during periods of buffer fill associated with the streaming of media. Examples disclosed herein use the characteristics of the bandwidth to extract parameters for use in a prediction model. The example prediction model is used to forecast a time at which the end of the streaming media file will be reached.

Examples disclosed herein are applicable to any streaming media protocol (e.g. Dynamic Adaptive Streaming over HTTP (DASH), Adaptive Bit-Rate Streaming, HTTP Live Streaming (HLS), Real-Time Streaming Protocol (RTSP), Real-Time Protocol (RTP), Real-Time Control Protocol (RTCP), and/or any suitable combination or future protocol).

FIG. 1 is a block diagram of an example environment in which example methods apparatus and/or articles of manufacture disclosed herein may be used for predicting end times of streaming media. In the example environment of FIG. 1, media streamed from a streaming media distributor 120 to example user devices 101a-101c. The example environment includes the example user devices 101a-101c, an example proxy server 105, an example network 115, and the example streaming media distributor 120. In the example of FIG. 1, an audience measurement entity 125, such as The Nielsen Company (US), LLC, includes an example predictor 130 for predicting the end of streaming media.

In the illustrated example, one of the example user devices 101a-101c, initiates a streaming media application to stream media (e.g., example user device 101a). A request to stream media is transmitted to the example streaming media distributor 120 by the example user device 101a. The request is routed through the example proxy server 105 and the example network 115. The example streaming media distributor 120 acknowledges the request, and begins streaming media to the example user device 101a through the example proxy server 105 using an encrypted stream. The encrypted stream prevents a proxy server 105 from accessing information regarding track mode operations and/or timestamp information associated with the streaming media. While the media is streaming to the example user device 101a, the example proxy server 105 extracts available data and/or metadata associated with the streaming media, (e.g., bandwidth rates, source and destination ports, internet protocol addresses, etc.) and transmits the extracted data and/or metadata to a predictor 130 at the example audience measurement entity 125. The example predictor 130 uses the transmitted data (e.g., bandwidth rates) to predict when the media will stop (or already did stop) presenting on the user device 101a. For example, the predictor 130 predicts the end time when such time is not directly accessible to the example proxy server 105, the audience measurement entity 125, nor the example predictor 130 during the streaming of the media.

The example user devices 101a-101c of the illustrated example may be implemented by any device that supports streaming applications and/or streaming media (e.g. smart televisions, tablets, game consoles, mobile phones, smart phones, streaming media devices, computers, laptops, tablets, Digital Versatile Disk (DVD) players, Roku™ devices, Internet television apparati (e.g., Google™ Chromecast™, Google™ TV, Apple™ TV, etc.) and/or other electronic devices). The example user devices 101a-101c communicate with the example streaming media distributor 120 via the proxy server 105 using the network 115.

The example network 115 may be any type of communications network, (e.g., the Internet, a local area network, a wide area network, a cellular data network, etc.) facilitated by a wired and/or wireless connection (e.g., a cable/DSL/satellite modem, a cell tower, etc.). The example network may be a local area network, a wide area network, or any combination of networks.

The example proxy server 105 of the illustrated example is a network device located in a monitored household that acts as an intermediary for communications (e.g., streaming media requests and responses including streaming media) involving one or more of the example user devices 101a-101c and/or one or more other components connected to the example network 115. Alternatively, the example proxy server 105 may be located in a separate location from the monitored household. For example, the example proxy server 105 may be a router, a gateway, a server, and/or any device capable of acting as a network traffic intermediary. For example, a broadband modem and/or router may implement the proxy server 105. According to the illustrated example, the proxy server 105 is an intermediary for communications between the example user devices 101a-101c and the example streaming media distributor 120.

For example, when the example user device 101a sends a request for media to the streaming media distributor 120, the request is first routed to the example proxy server 105. The example proxy server 105 then transmits the request to the example streaming media distributor 120 (e.g., the request may be transmitted after being modified to indicate that a response to the request should be routed to the proxy server 105). When the example streaming media distributor 120 responds to the request, the response is routed to the example proxy server 105, which re-transmits the request to the example user device 101a.

As the example proxy server 105 is involved in communications associated with the example user devices 101a-101c, the example proxy server 105 is capable of gathering information about those communications. While the example proxy server 105 is referred to as a "proxy" device, the proxy server 105 may not perform functions typically associated with a proxy (e.g., performing packet translation). Rather, the functions of the proxy server 105 described in examples herein, may be performed by any type of device to collect information about communications between the example user devices 101a-101c and the example streaming media provider 120 (e.g., the example proxy server 105 may not participate in the communication chain and, instead, may monitor the communications from the sidelines using, for example, packet mirroring, packet snooping, or any other technique).

In the illustrated example, the proxy server 105 transmits collected information to the audience measurement entity 125. The example proxy server 105 collects, calculates, and/or correlates bandwidth information for a streaming media application. In some examples, the example proxy server 105 identifies and collects data originating from the streaming media distributor 120 and delivered to the user devices 101a-101c. For example, the example proxy server 105 may collect and correlate traffic based on one or more characteristics such as simple network management protocol (SNMP), internet protocol (IP) addresses, sub-protocols of the Internet Protocol suite (e.g., real-time streaming protocol (RTSP)), port information, service designation, user agent, etc. One or more of the above characteristics may be indicative of a specific streaming media distributor 120 (e.g., a source IP address). The example proxy server 105 also determines the rate (e.g., bandwidth rate) at which the data passes through the proxy server 105 and/or the rate at which data is streamed from the streaming media distributor 120 to the user devices 101a-101c. Combining the correlated traffic and the rate (e.g., data rate, bandwidth rate, etc.) at which the traffic passes through the device allows for application specific bandwidth rate monitoring. The proxy server 105 collects and transmits the bandwidth rate of the streaming media application and the application identification to the example predictor 130. In this way, data (e.g., bandwidth rate) is not required to be sent from a media device presenting the streaming media nor from a streaming media distributor transmitting the streaming media to the media device. Additionally or alternatively, the example proxy server 105 mirrors the traffic to the example predictor 130 for collection, calculation, and/or correlation.

Other network topologies than those illustrated in FIG. 1 may be utilized with example methods and apparatus disclosed herein. For example, the proxy server 105 may not be included in the system 100 when other devices or components can provide information about communications (e.g., bandwidth rates may be reported by the user devices 101a-101c). Additionally or alternatively, communications may be routed through the example audience measurement entity 125 and/or mirrored to the example audience measurement entity 125. In some such examples, the audience measurement entity 125 monitors and gathers information about the communications with or without information from other devices such as the proxy server 105.

The audience measurement entity 125 of the illustrated example includes an example predictor 130. In this example, the example predictor 130 obtains the bandwidth rate from the proxy server 105 while the example user devices 101a-101c stream media from the example streaming media distributor 120. However, as explained above, the data rate (e.g., bandwidth rate) can alternatively be provided by other device(s). In some examples control information, text overlay, etc. are embedded within the stream. Thus, it is desirable to create a threshold bandwidth rate to distinguish the transmission of streaming media from transmission of other data carried in the stream. An example selection of such a threshold is described in conjunction with FIG. 3. In the illustrated example of FIG. 1, the example predictor 130 analyzes the bandwidth rate forwarded by the example proxy server 105 and determines end of stream times for the streaming media when the bandwidth exceeds the threshold.

In the illustrated example, one or more of the user devices 101a-101c are associated with a panelist who has agreed to be monitored by the audience measurement entity 125. The panelists are users registered on panels maintained by a ratings entity (e.g., an audience measurement entity 125) that owns and/or operates the ratings entity subsystem. Traditionally, audience measurement entities (also referred to herein as "ratings entities") determine demographic reach for advertising and media programming based on registered panel members. That is, an audience measurement entity 125 enrolls people that consent to being monitored into a panel. During enrollment, the audience measurement entity receives demographic information from the enrolling people so that subsequent correlations may be made between advertisement/media exposure to those panelists and different demographic markets.

People become panelists via, for example, a user interface presented on the user devices 101a-101c (e.g., via a website). People become panelists in additional or alternative manners such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In the panelist system of the illustrated example, consent is obtained from the user to monitor and analyze network data when the user joins and/or registers for the panel. For example, the panelist may agree to having their network traffic monitored by the proxy server 105. Although the example system of FIG. 1 is a panelist-based system, non-panelist and/or hybrid panelist systems may alternatively be employed.

Figure 2:
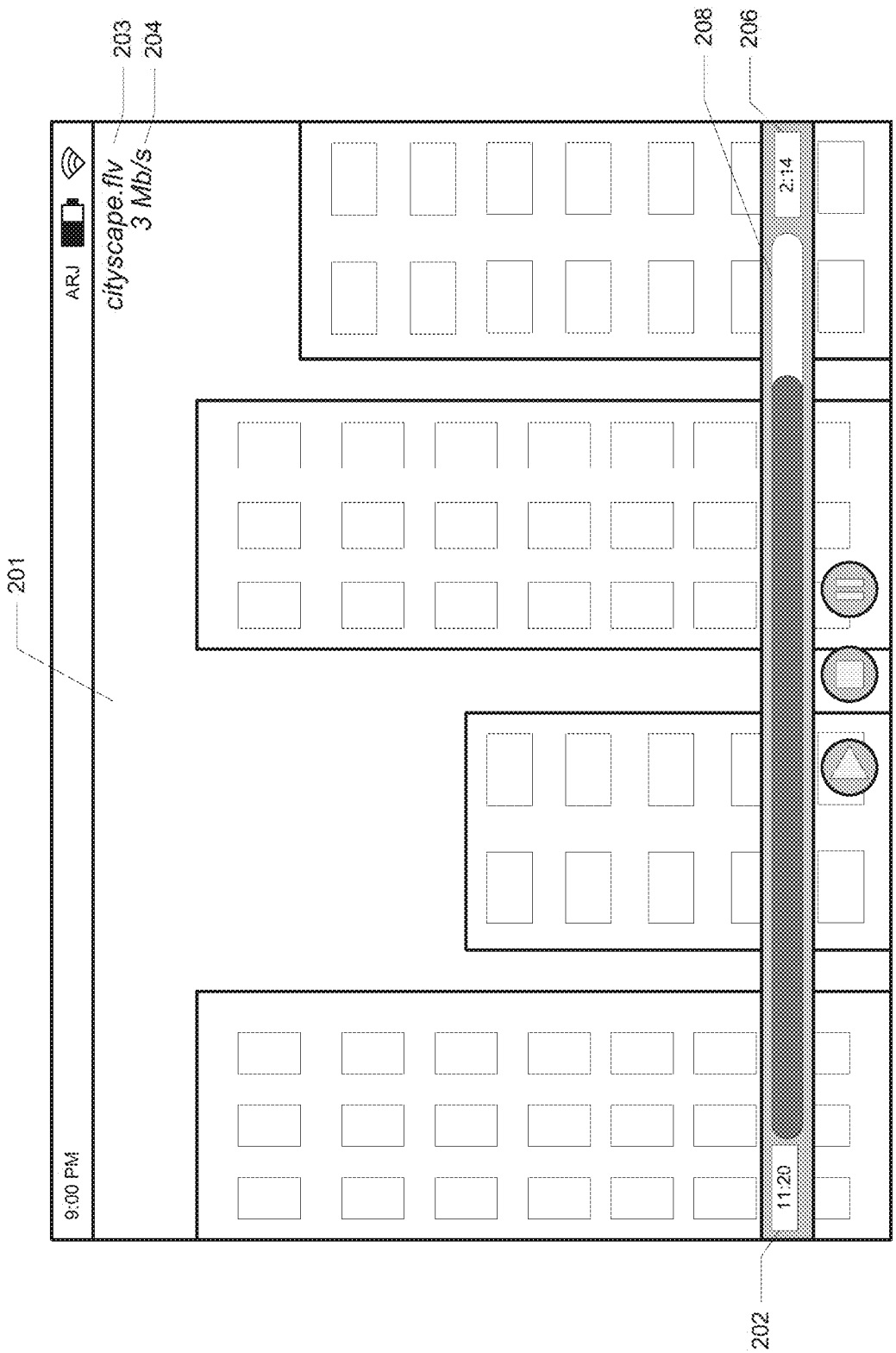
FIG. 2 is an illustration of an example streaming media application.

FIG. 2 illustrates an example streaming media application 201, executing on one of the example user devices 101a-101c. The example streaming media application 201 of this example presents media obtained from the streaming media distributor 120 on the corresponding example device 101a-101c. The graphical user interface of the streaming media application 201 presents data relevant to the presentation of the streaming media. In the example streaming media application 201 of FIG. 2, an elapsed time indicator 202 displays a length of the media presentation session and a total length of the media. A file ID indicator 203 shows the file name of the streaming media being presented.

In some examples, the file ID indicator 203 is analyzed by the example predictor 130 to determine a file format when available (e.g., if the streaming media is transmitted in an unencrypted stream). The example predictor 130 may access the contents of unencrypted streaming media packets (or encrypted packets for which a decryption process is available). The example data packets may include headers, or leading data, which indicates what video and/or audio is being streamed to the streaming media application 201. An example bandwidth indication field 204 displays the current bandwidth usage rate of the streaming media application 201. An example time remaining indicator 206 displays the predicted end of media time as indicated by the user device (e.g., 101a). An example progress bar 208, displays the graphical representation of the time remaining based on the values of the example elapsed time indicator 202 and example time remaining indicator 206.

In some examples, the data displayed by at the streaming media application 201 (e.g., codec type, file name, and/or time elapsed) may be inaccessible to the example predictor 130. However, the example predictor 130 may measure the value of the bandwidth rate by monitoring the traffic between the user device 101a-101c and the streaming media distributor 120.

Figure 3:
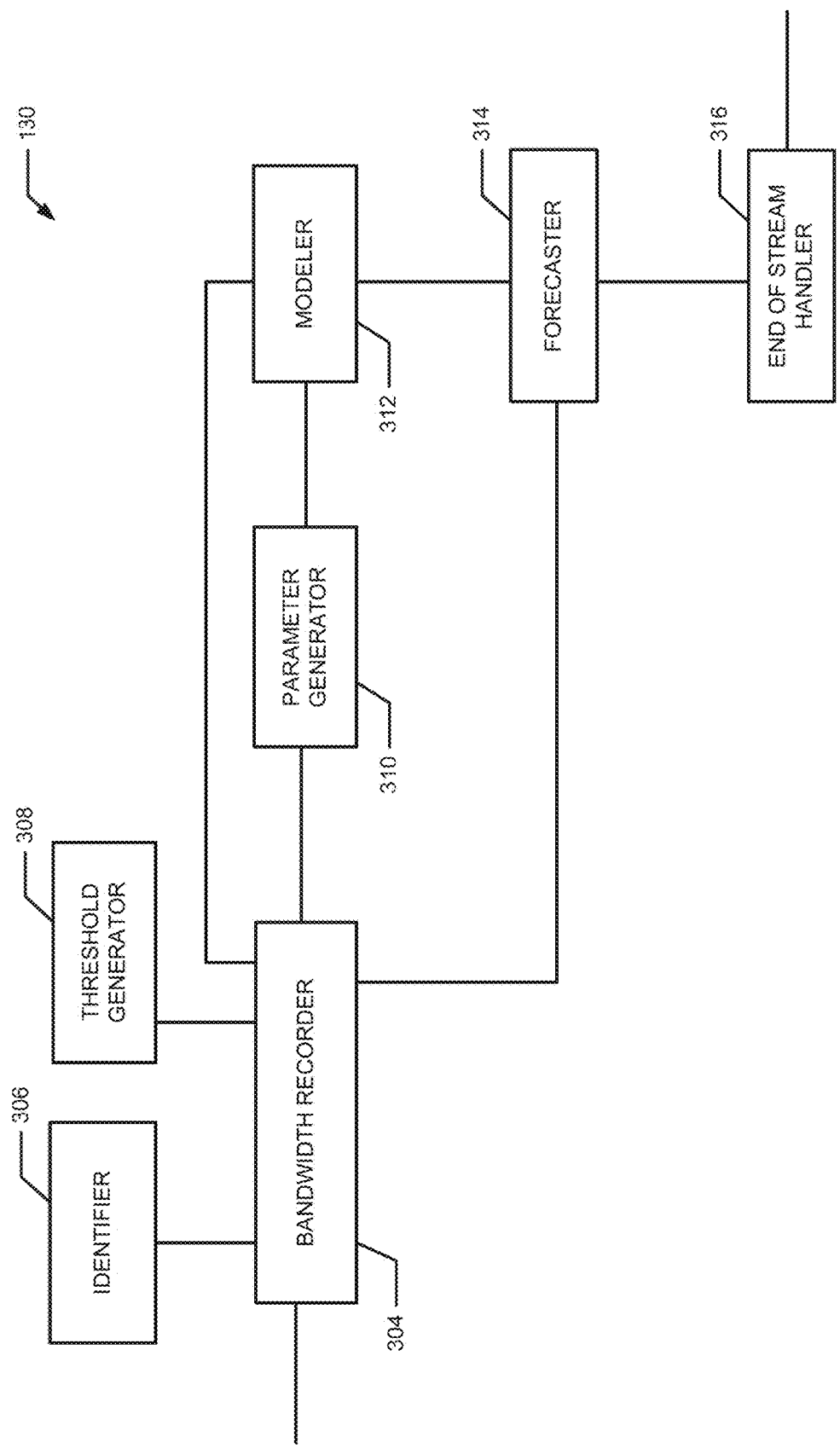
FIG. 3 is a block diagram of an example implementation of the predictor of FIG. 1 to predict the end of streaming media.

FIG. 3 is a block diagram of an example implementation of the example predictor 130 of FIG. 1. The example predictor 130 of FIG. 3 is provided with an example bandwidth recorder 304, an example identifier 306, an example threshold generator 308, an example parameter generator 310, an example modeler 312, an example forecaster 314, and an example end of stream handler 316.

The example bandwidth recorder 304 of FIG. 3 observes and records the bandwidth rates forwarded by the example proxy server 105 of FIG. 1. In the example FIG. 3, the bandwidth recorder 304 is in communication with an example identifier 306 and an example threshold generator 308. The bandwidth rates forwarded by the example proxy server 105 are the bandwidth rates associated with the streaming media application 201 while the streaming media application 201 is streaming media.

The example identifier 306 determines the format of media being streamed in the streaming media application 201. In the illustrated example of FIG. 3, when the streaming media application 201 begins to stream media, the example identifier 306 analyzes data delivered to the example bandwidth recorder 304 by the proxy server 105 to determine the audio and/or video codec of the streaming media. In some examples, the example identifier 306 knows the file format of the media used by the streaming media application 201 prior to streaming because such file formats may be proprietary (e.g., the example identifier 306 is informed of the file format by the example proxy server 105). The media format determined by the example identifier 306 is sent to the example bandwidth recorder 304. In some examples where a media format is not determined by the example identifier 306, the example bandwidth recorder 304 is notified that the media format is undetermined.

The example threshold generator 308 in the illustrated example obtains the media format of streaming media from the example identifier 306. When the media format is obtained, the example threshold generator 308 references a look-up-table to determine a threshold for the bandwidth rate which signifies (1) that bandwidth rates should begin (e.g., when bandwidth exceeds the threshold) or cease (e.g., when bandwidth is below the threshold) to be stored in a metering dataset and (2) that a prediction should be made regarding end of stream time. For example, when bandwidth rates are above the set threshold, the bandwidth rates are recorded to a metering dataset and the predictor 130 is primed to generate a prediction. When the bandwidth rates are below the threshold, the bandwidth rates are not recorded to a metering dataset and the predictor 130 should be generating a prediction with respect to a completed metering dataset.

In examples where a media format is not determined by the example identifier 306, the threshold may be set to a default, or predetermined, value by the example threshold generator 308. In some examples, the threshold generator 308 determines that the format of the streaming media contains only streaming media and does not contain any other information such as text overlays and/or track mode commands. In such an example, a threshold may not be set for recording the bandwidth rate (e.g., a threshold may be determined to be unnecessary or may be otherwise excluded because it is not necessary to differentiate between the streaming media and other information carried in the stream). The threshold generator 308 of the illustrated example transmits the threshold to the example bandwidth recorder 304.

In the illustrated example of FIG. 3, the example bandwidth recorder 304 monitors and/or records the bandwidth rate forwarded by the example proxy server 105 and compares the bandwidth rate to the threshold determined by the example threshold generator 308. When the example bandwidth recorder 304 determines that the bandwidth rate meets or exceeds the threshold, the example bandwidth recorder 304 begins to store the bandwidth rates and their associated time-stamps in a metering dataset. The metering dataset is used to store the values of bandwidth rates from a first time that the bandwidth rates meet or exceed the threshold until a second time that the bandwidth rates meet or fall below the threshold after the first time. When complete, the metering dataset values are used for generating the parameters used in generating a prediction model (e.g., prediction model parameters). The example bandwidth recorder 304 monitors the bandwidth rate to determine when the bandwidth rate falls below the threshold set by the example threshold generator 308. When the bandwidth rate falls below the set threshold after having previously met or exceeded the threshold, the example modeler 312 is notified that the metering dataset (e.g., the bandwidth rates recorded between the time that the bandwidth rate met or exceeded the threshold and the later time that the bandwidth rate met or dropped below the threshold) is ready for processing by the example parameter generator 310. The example bandwidth recorder 304 continues to monitor the bandwidth rates forwarded by the proxy server after the completion of the dataset.

The example parameter generator 310 of the illustrated example calculates and/or identifies a prediction model to generate a streaming duration prediction model. Each time a prediction model is generated, the example parameter generator 310 generates a new set of parameters in the event that a characteristic of the streaming media has changed. For example, the bit rate of the streaming media may change during streaming if the streaming media is streaming using adaptive bit-rate streaming. The example parameter generator 310 accesses the metering dataset and begins a series of calculations to determine characteristic parameters of the metering dataset. In the illustrated example, the parameter generator 310 calculates the mean and the standard deviation of the metering dataset. The example parameter generator 310 also identifies a decay factor for the prediction model. The decay factor represents the rate at which the prediction model decays or decreases from a peak value of the prediction model to a zero value (or negative infinity based on the prediction model utilized). In some examples, the decay factor may be identified based on the type of streaming media (e.g., audio and/or video). In other examples, the decay factor may be identified from the codec of the media being streamed. In some examples, the decay factor may be identified based on the bit rate of the streaming media. In yet other examples, the decay factor may be uniform for all media types and/or codecs. The example parameter generator 310 stores the prediction model parameters and the decay factor associated with the prediction model parameters.

When the example parameter generator 310 generates parameters for the dataset, it notifies the example modeler 312.

The example modeler 312 of FIG. 3 generates a prediction model based on the prediction model parameters created by the example parameter generator 310. When the example modeler 312 receives notification from the example parameter generator 310 that the prediction model is to be generated, the example modeler 312 retrieves the prediction model parameters and the decay factor associated with the streaming media. The example modeler 312 generates the prediction model using the parameters provided by the example parameter generator 310. In some examples, before releasing the prediction model to the example forecaster 314, the prediction model parameters may be adjusted. For example, the adjustment by the example modeler 312 may align the scale (e.g., amplitude) and the mean (e.g., temporal location) of the prediction model to the scale and the mean of the metering dataset used to generate the prediction model. When the scale and mean of the example prediction model match the scale and mean of the primary dataset, the prediction model is forwarded to the example bandwidth recorder 304 and the example forecaster 314.

The example bandwidth recorder 304 uses the prediction model while continuing to monitor the bandwidth rate sent by the example proxy server 105. When a prediction model has been generated, the example bandwidth recorder 304 continues creating metering datasets as described above and also compares the observed bandwidth rate against the prediction model. If the value of the bandwidth rate exceeds the prediction model (e.g., the amplitude of the bandwidth rate exceeds the amplitude of the prediction model), the example bandwidth recorder 304 will signal the example parameter generator 310 that new parameters should be generated for a new metering dataset to generate an updated prediction model.

The example forecaster 314 of FIG. 3 obtains the prediction model and begins iterating, using temporal increments (e.g. tenths, hundredths, thousandths of a second), over the prediction model starting from the mean value (the mean value being the temporal location of the maximum value of the metering dataset). The prediction model is a function of time (as will be explained in more detail below in conjunction with FIG. 6). Therefore, using time values, the example forecaster 314 calculates a value for every unit of time after the temporal location of the mean. The example forecaster 314 continues iterating over increasing time values until the prediction model produces (or is indicative of) a value at or below the threshold generated by the example threshold generator 308. The value that is at or below the threshold signifies the time at which the example forecaster 314 predicts that the streaming media will end, or more specifically, when the buffer on the user device will be emptied complete the presentation of the streaming media after the transfer of the streaming media via the network 115. When the value at or below the threshold is reached, the example forecaster 314 determines that the time at which the value at or below the threshold was identified is the predicted end of stream time and forwards the end of stream time to the example end of stream handler 316. In some examples, when no threshold is utilized, the iteration performed by the example forecaster 314 may stop when a value of zero (or the first negative value) is reached.

The example end of stream handler 316 stores and/or transmits the forecasted end of stream time to a data collection facility at or remote from, the audience measurement entity 125. In some examples, the end of stream handler 316 may perform other actions in response to the end of stream time. For example, at the time indicated as the end of stream time, the end of stream handler 316 may transmit a survey to the user device(s) 101a-101c streaming the media. In other examples, the predicted end of stream time may be used to send a command to extract advertisement(s) embedded in the streaming media.

While an example manner of implementing the predictor 130 of FIG. 1 is illustrated in FIG. 3, one or more of the elements, processes and/or devices illustrated in FIG. 3 may be combined, divided, re-arranged, omitted, eliminated and/or implemented in any other way. Further, the example bandwidth recorder 304, the example identifier 306, the example threshold generator 308, the example parameter generator 310, the example modeler 312, the example forecaster 314, and the example end of stream handler 316 and/or, more generally, the example predictor 130 of FIG. 1 may be implemented by hardware, software, firmware and/or any combination of hardware, software and/or firmware. Thus, for example, any of the example bandwidth recorder 304, the example identifier 306, the example threshold generator 308, the example parameter generator 310, the example modeler 312, the example forecaster 314, and the example end of stream handler 316 and/or, more generally, the example predictor 130 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example bandwidth recorder 304, the example identifier 306, the example threshold generator 308, the example parameter generator 310, the example modeler 312, the example forecaster 314, and the example end of stream handler 316 and/or the example predictor 130 are hereby expressly defined to include a tangible computer readable storage device or storage disc such as a memory, DVD, CD, Blu-ray, etc. storing the software and/or firmware. Further still, the example predictor 130 of FIG. 1 may include one or more elements, processes and/or devices in addition to, or instead of, those illustrated in FIG. 3, and/or may include more than one of any or all of the illustrated elements, processes and devices.

Figure 4:
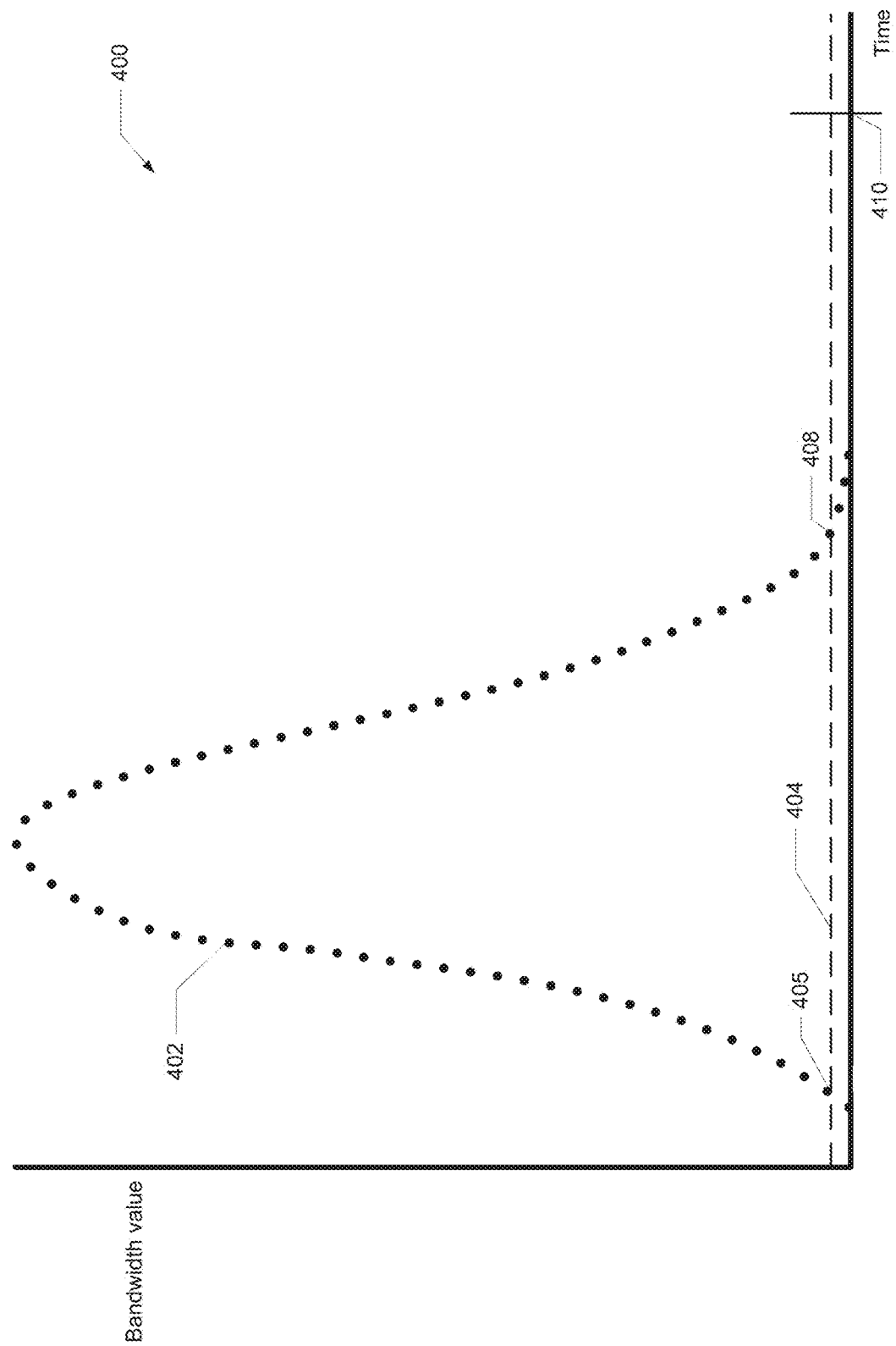
FIG. 4 is an example graph illustrating observed bandwidth rates of a streaming media application in the process of streaming media.

FIG. 4 illustrates a graphical illustration 400 of example bandwidth rates forwarded from the example proxy server 105 of FIG. 1 for streaming of example media to an example one of the user devices 101a-101c. The example bandwidth rates represent the rates of the traffic between the example streaming media distributor 120 and one of the example user devices 101a-101c as seen at the proxy server 105. In the illustrated example of FIG. 4, one cycle of buffer filling during streaming of media is represented by bandwidth rate curve 402. For example, a cycle of buffer filling is a period of time where a buffer fills with downloaded media at increasing, and then decreasing rates, to be presented uninterrupted. In some examples regarding adaptive bit-rate streaming, a streaming media file is partitioned into smaller packets for downloading. The downloading of the smaller packets into the buffer creates spikes in bandwidth much the same as when a buffer fill and empty cycling may create such spikes.

The example bandwidth rate curve 402 is observed to increase as the buffer of the user device 101a-101c is filled (or a portion of the media is downloaded) and decreases when the buffer reaches capacity (or the portion of the media has been transferred). At a certain capacity of the buffer or after a certain percentage of a packet is downloaded, 50% for example, the user device 101a-101c tapers the bandwidth rate, or speed at which data is downloaded. The tapering occurs so that the downloaded data is not lost due to lack of buffer space. This behavior is represented in the shape of the bandwidth rate curve 402. As the buffer begins filling, the bandwidth rate gradually increases to a peak and then begins to taper off as the certain capacity is reached. This tapering continues until the entire media file is downloaded (assuming uninterrupted streaming).

In the illustrated example, the bandwidth recorder 304 monitors the bandwidth forwarded by the example proxy server 105. The example identifier 306 determines that the streaming media is of, for example, a flash video format and informs the example threshold generator 308 of the media format. The example threshold generator 308 sets the threshold 404 and informs the example bandwidth recorder 304 of the threshold. When the bandwidth rate is observed to be at the threshold 404 at time 405, the example bandwidth recorder 304 begins storing the bandwidth rates in a metered dataset. When the bandwidth rate is observed to be at the threshold 404 at time 408, after previously exceeding the threshold at time 405, then the bandwidth recorder 304 stops appending values to the metering dataset. Thus, the values of the bandwidth curve between time 405 and time 408 comprise the metering dataset 402 (also referred to herein as the bandwidth rate curve 402). Though, the example predictor 130, in some examples, does not know the time that the media ceases streaming at the user device 101a-101c (e.g., however, the end time can be predicted by the predictor 130), the media is illustrated to end presentation at time 410. Though streaming has ceased, reading out of the buffer at the user device 101a-101c continues for some time thereafter.

Figure 5A:
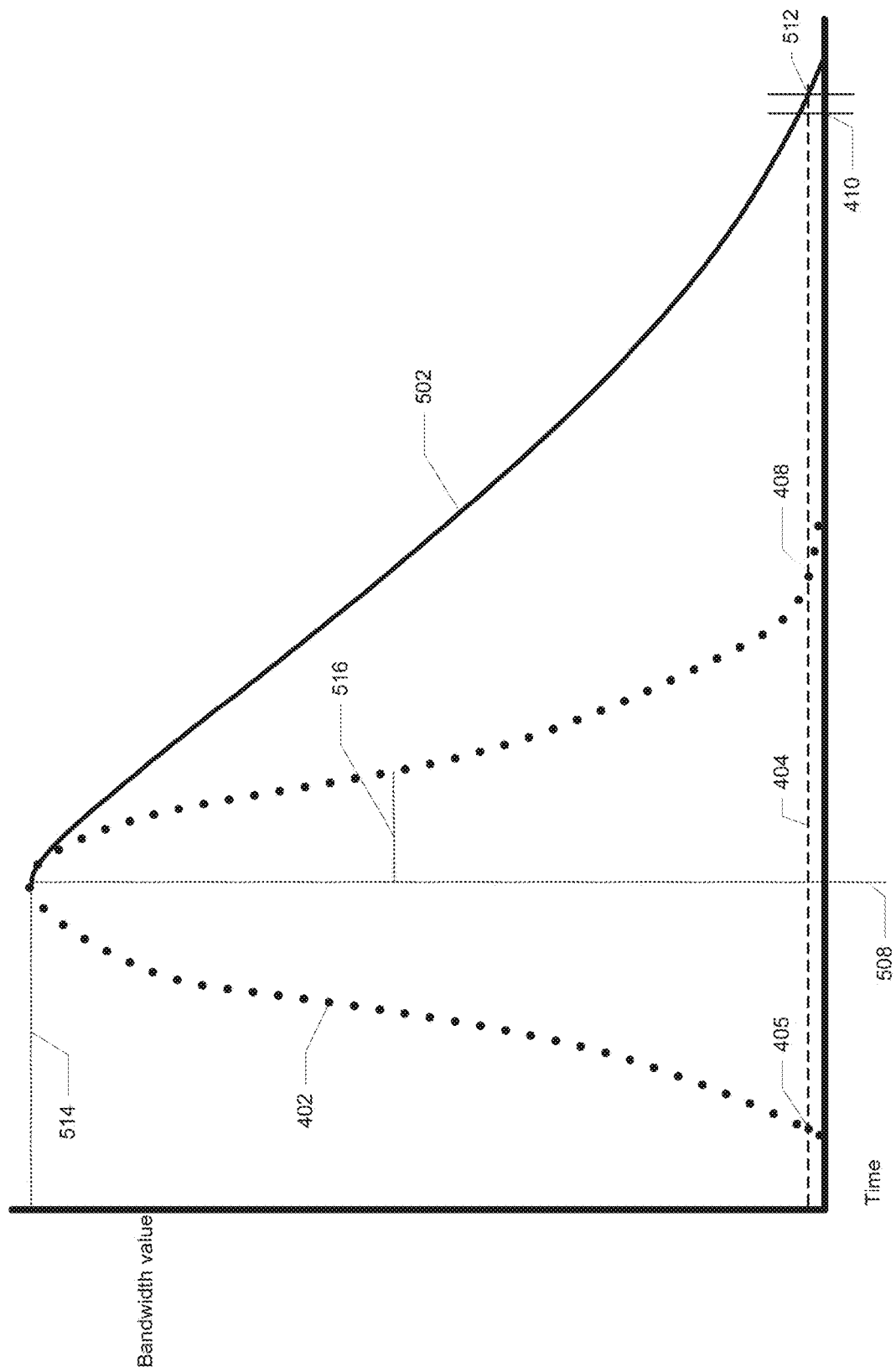
FIG. 5A is an example graph of (a) the observed bandwidth rates of FIG. 4 and (b) an example prediction model.

FIG. 5A illustrates an example graph 402 of FIG. 4 on a timeline with an example prediction model curve 502 generated by an example predictor 130 based upon the prediction model parameters generated from the metering dataset 402. At the time 408 that the example metering dataset 402 falls below the example threshold 404, the example bandwidth recorder 304 notifies the example parameter generator 310 that the metering dataset 402 is complete. In the illustrated example of FIG. 5, the example parameter generator 310 calculates a mean 508, an amplitude 514, and a standard deviation 516 of the metering dataset 402. Additionally, the parameter generator 310 determines the decay factor associated with the identified media type (e.g., flash video). The example parameter generator 310 makes the prediction model parameters (the mean, the amplitude, the standard deviation, and the decay factor) available to the example modeler 312. The example modeler 312 then generates the prediction model curve 502 using the model based on the prediction model parameters generated by the example parameter generator 310. In the illustrated example, the prediction model 502 is generated using an exponentially modified Gaussian (EMG) distribution function. Alternatively, other suitable prediction models may be used as described in further detail below. The example modeler 312 sends the prediction model to the example bandwidth recorder 304 and the example forecaster 314.

The example forecaster 314 then iterates time values in the example prediction model 502 until a time dependent solution (or value) 512 of the example prediction model 502 is at or under the threshold 404. The threshold 404 is used in the illustrated example to determine the end of the stream time due to the characteristics of the prediction model utilized (the exponentially modified Gaussian (EMG)). The EMG function does not go to zero until it reaches infinity, thus a threshold may be utilized to indicate a bandwidth rate below which it is determined that streaming has substantially stopped. In some examples, a second threshold may be utilized that lies substantially closer to zero than the threshold 404 used to create the metering dataset. Regardless, the temporal location of the value 512 which is determined to be at or below the threshold is reported as the predicted end of streaming time. This approach has been empirically found to predict end of stream times that are substantially close to the actual end of stream time 410 observed at the one of the user devices 101a-101c. The end of stream time represents the time at which the entire media stream has been played out of the buffer.

Figure 5B:
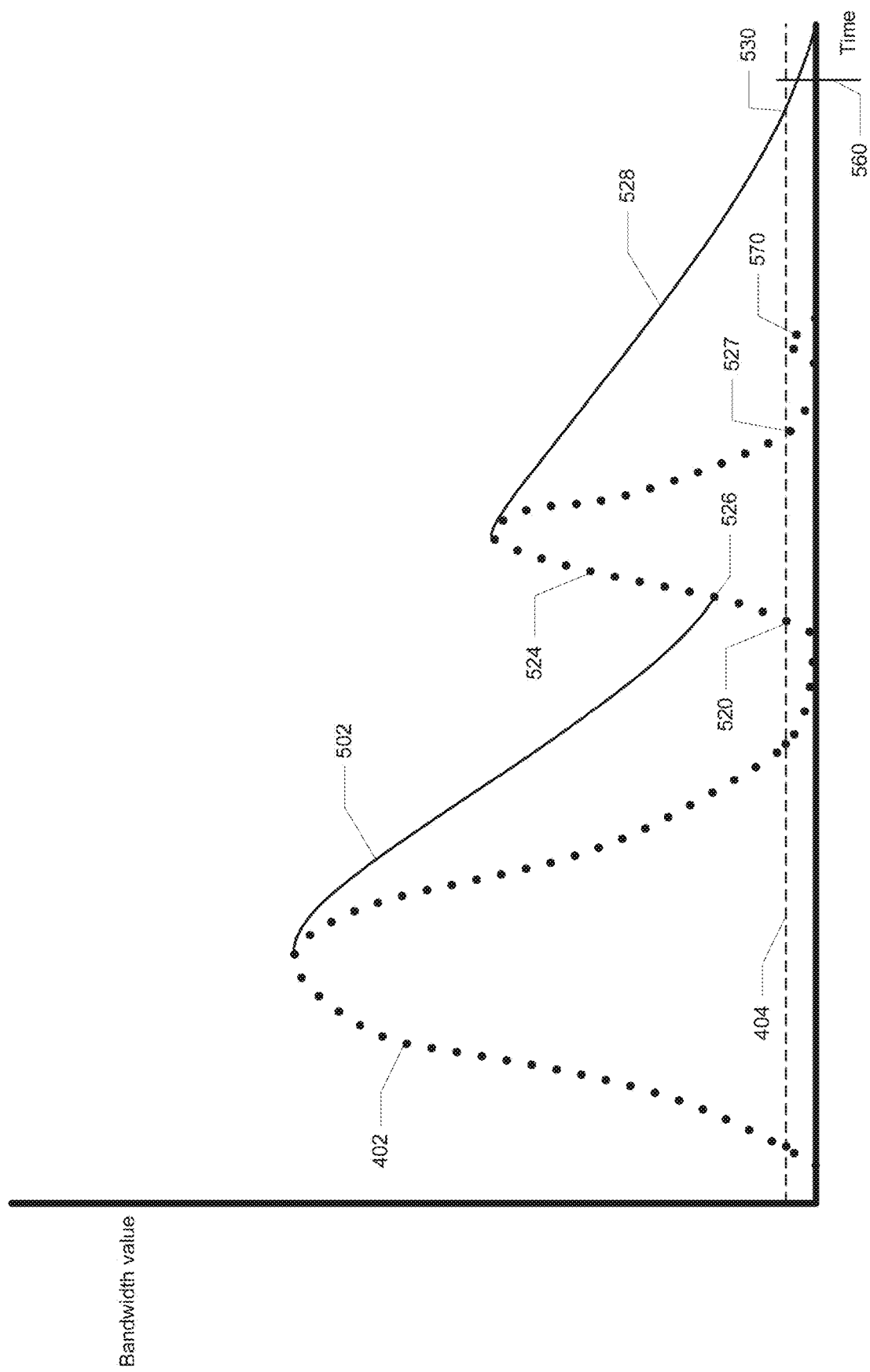
FIG. 5B is an example graph of (a) observed bandwidth rates of a streaming media application in the process of streaming media and (b) prediction models associated with the observed bandwidth rates.

FIG. 5B is an example graph illustrating observed bandwidth of streaming media and associated prediction model curves. The illustrated example of FIG. 5B includes the example metering dataset 402 and the example prediction model curve 502 of FIG. 5A. However, in the example of FIG. 5B, after the bandwidth rate drops below the threshold 404, the media continues streaming, and the bandwidth recorder 304 determines that the bandwidth rate is at or exceeding the threshold 404 at a second time 520. In response to the bandwidth rate exceeding the threshold 404 at time 520, the example bandwidth recorder 304 creates a second metering dataset 524. While recording the second metering dataset 524, the example bandwidth recorder 304 compares the recorded bandwidth rate to the previously generated prediction model curve 502. The example bandwidth recorder 304 determines that, at time 526, the second metering dataset 524 has met or exceeded the previous prediction model curve 502. If the bandwidth rate (e.g., the bandwidth rate of the second metering dataset 524) is greater than that of the previous prediction model (e.g., the prediction model curve 502) at the time of comparison, a new prediction model is generated. The example bandwidth recorder 304 notifies the example forecaster 314 to disregard the example prediction model curve 502. The example parameter generator 310 generates new prediction model parameters when the second metering dataset is observed to be at or below the threshold 404 at a second time (e.g., time 527). The example modeler 312 generates the second prediction model 528, and the example forecaster 314 determines a new predicted end of stream time 530, which is substantially close to the example end of stream time 560 observed at the corresponding user device 101a-101c. The example bandwidth recorder 304 continues to monitor the bandwidth rates as they rise a third time 570. However, no action is taken in this instance because the third spike of bandwidth rates 570 does not meet or exceed the threshold 404. By continuing to monitor bandwidth rates and compare them with generated prediction models to trigger regeneration of the prediction model, a more accurate end of stream time can be predicted.

Figure 6:
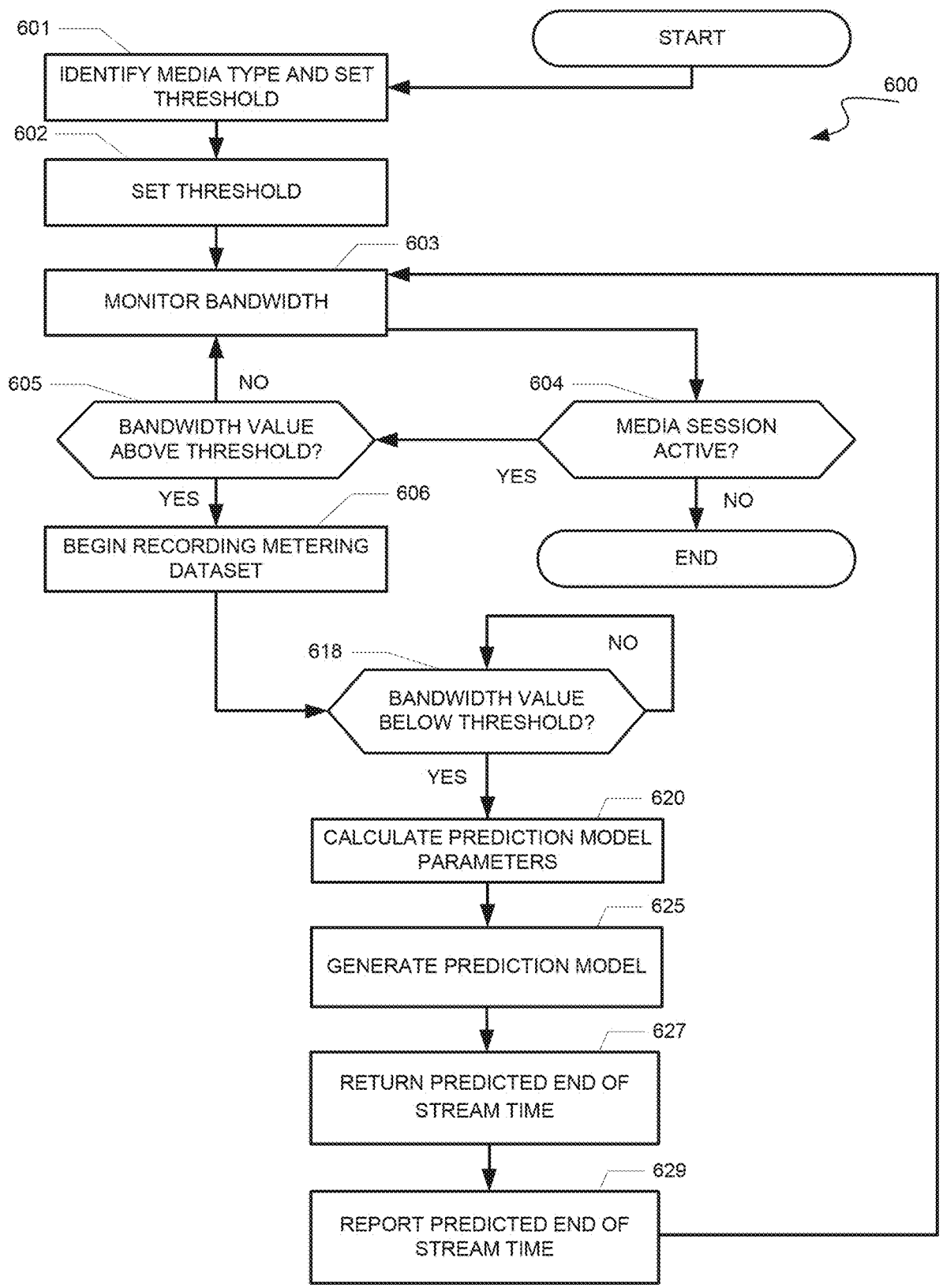
FIG. 6 is a flow diagram representative of example machine readable instructions that may be executed to implement the example predictor of FIG. 3 to predict the end of streaming media.

A flowchart representative of example machine readable instructions for implementing the predictor 130 of FIG. 3 is shown in FIG. 6. In this example, the machine readable instructions comprise a program for execution by a processor such as the processor 912 shown in the example processor platform 900 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 6, many other methods of implementing the example predictor 130 may alternatively be used. For example, the order of execution of the blocks may be changed, and/or some of the blocks described may be changed, eliminated, or combined.

As mentioned above, the example processes of FIGS. 6, 7, and 8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 6, 7, and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 6 is a flowchart representative of example machine readable instructions that may be executed to implement the example predictor 130. The example program 600 may be initiated, for example, when the example user device 101a begins to stream media from the example streaming media distributor 120 in a streaming media application.

Initially, at block 601, the example identifier 306 identifies the format of streaming media associated with information received from the example proxy server 105 by the example bandwidth recorder 304 and forwards the identified format to the example threshold generator 308. For example, when the information about streaming media arrives at the example bandwidth recorder 304 of the audience measurement entity 125, a media format is determined from the information (e.g., audio only formats, video only formats, or container formats containing both audio and video). Additionally or alternatively, the media format may be identified in the information (e.g., the proxy server 105 may determine and report the format). The example threshold generator 308 cross-references the determined media format is cross-referenced to thresholds for known media formats to establish a bandwidth rate threshold (e.g., threshold 404 of FIGS. 4, 5A, and 5B) for distinguishing media from ancillary information embedded in the streaming media (block 602). The example threshold generator 308 sets the threshold for media distinction based on the determined media format. This threshold represents a base value for the bandwidth rate, and serves to provide a more accurate prediction time than instances where no threshold is used (e.g., bandwidth below this threshold is assumed to be so insignificant that monitoring should not occur until the threshold is met). For example, without a threshold value, prediction models may be created for bandwidth rates of text overlays embedded in a stream which, in some instances, may lead to inconsistent end of stream predictions.

At block 603, the example bandwidth recorder 304 monitors the bandwidth rate forwarded from the example proxy server 105. In some examples, the bandwidth rate may fluctuate erratically while streaming media. To observe smoother bandwidth values, the example bandwidth recorder 304 utilizes a monitoring period to obtain a time-averaged bandwidth rate. For example, at the example bandwidth recorder 304, the bandwidth value is monitored every tenth of a second for a two second period. The value recorded as the bandwidth value by the example bandwidth recorder 304 is an average of the twenty observed bandwidth usage rate values over the two second period. In other examples, the value recorded by the example bandwidth recorder 304 may be an instant bandwidth usage rate value, or may be averaged over any interval.

At block 604, the example bandwidth recorder 304 determines if the media session is currently active between the user device 101a-101c and the streaming media distributor 120. For example, the bandwidth recorder 304 of the illustrated example determines if the proxy server 105 reports that a streaming media session is still open. In the event that the example bandwidth recorder 304 determines that the streaming media session is no longer active, the example program 600 terminates. However, in the event that media session is still open, control proceeds to block 605.

At block 605, the example bandwidth recorder 304 compares the bandwidth rate to the threshold to determine if the prediction model should be generated. If the bandwidth rate is below the threshold, control returns to block 603 to await the bandwidth rate exceeding the threshold. If the example bandwidth recorder 304 determines that the measured bandwidth rate value exceeds the threshold the example bandwidth recorder 304 utilizes the bandwidth rate exceeding the threshold and the time at which the bandwidth rate exceeded the threshold as the initial values recorded in a metering dataset (block 606). The example bandwidth recorder 304 records the subsequent bandwidth rates and associated timestamps in the metering dataset and moves to block 618.

At block 618, the bandwidth rate is below the threshold. When the bandwidth value 400 is determined to be above the threshold, control remains at block 618 while the example bandwidth recorder 304 monitors for a bandwidth value that is at or below the threshold.

Figure 7:
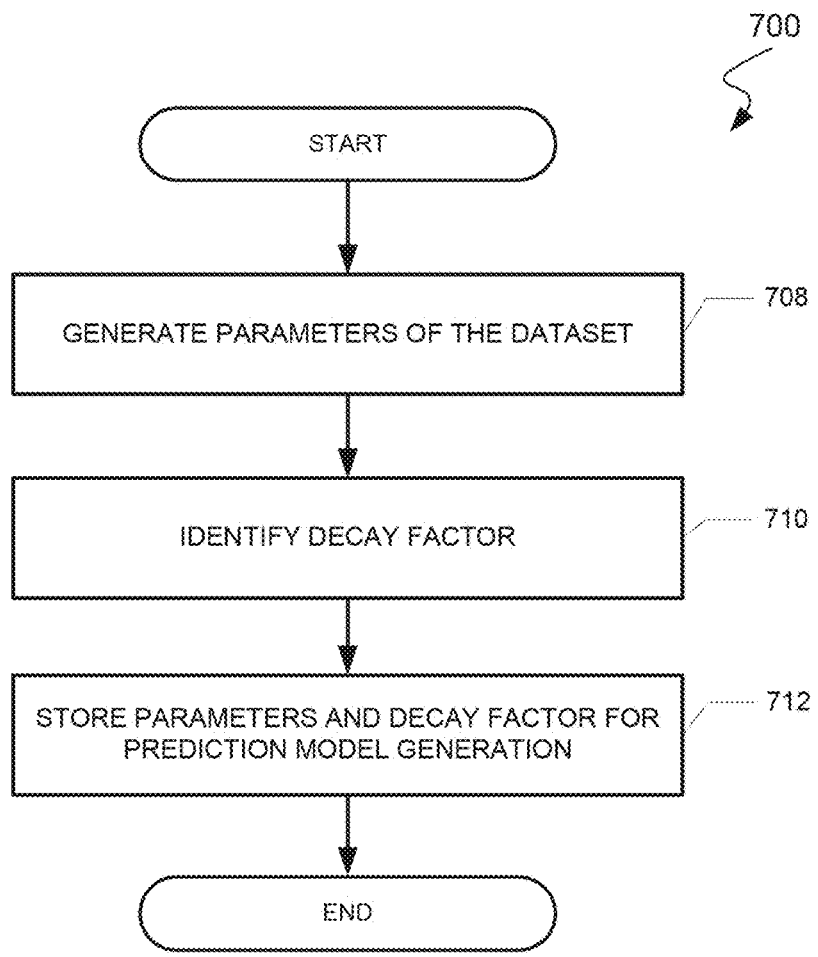
FIG. 7 is a flow diagram representative of example machine readable instructions that may be executed to implement the example predictor of FIG. 3 to generate parameters for prediction model generation.

When the bandwidth value is determined to be below the threshold (block 618), the metering dataset is determined to be complete. The example parameter generator 310 determines prediction model parameters from the metering dataset (block 620), the prediction model parameters are to be used in generating a prediction model. For example, parameters such as a mean value, a scale (i.e. amplitude), a standard deviation, and a variance may be calculated by the example parameter generator 310. An example flowchart illustrating example machine readable instructions that may be executed to implement block 620 (e.g., the instructions for implementing the parameter generator 310) are depicted in FIG. 7. When the prediction model parameters are calculated, the example parameter generator 310 notifies the example modeler 312 that parameters are available for generation of a prediction model 502. Control proceeds to block 625.

At block 625, the example modeler 312 generates the prediction model using the prediction model parameters calculated from the metering dataset. The prediction model(s) may be generated by the example modeler 312 using distribution functions. For example, the predictions may be modeled using an exponentially modified Gaussian distribution.

$$f(t; \mu, \sigma, \lambda) = \frac{\lambda}{2} e^{\frac{\lambda}{2}(2\mu + \lambda \sigma^2 - 2t)} \text{erfc}\left(\frac{\mu - \lambda \sigma^2 - t}{\sqrt{2}\sigma}\right) \quad \text{Equation 1}$$

In Equation 1, mu (μ) represents the mean of the metering dataset, sigma squared ($\sigma^2$) represents the variance of the metering dataset, and lambda (λ) represents a rate of the exponential (e.g., a decay factor). Mu (μ) and sigma squared ($\sigma^2$) are based on the metering dataset and lambda may be customized or adjusted based on the type of media being streamed.

Other suitable distributions may include a chi-squared distribution, an exponential distribution, a gamma distribution, a Laplace distribution, a Pareto distribution, a Weibull distribution, a log-normal distribution, or any other suitable probabilistic distribution capable of being modeled with a right-handed decay. In some other examples, a piecewise function comprised of a plurality of functions, defining behavior over an interval may be used to generate a suitable prediction model. In other words, an example prediction model will have one maximum on the interval, (−∞<t<∞), and will conform to one of the following properties:

$$\lim_{t \to \infty} f(t) = 0 \quad (1)$$

$$\lim_{t \to \infty} f(t) = -\infty \quad (2)$$

If the prediction model conforms to one of the limits set forth above, the prediction model will decay after the maximum and approach zero (or negative infinity) as time approaches infinity.

Figure 8:
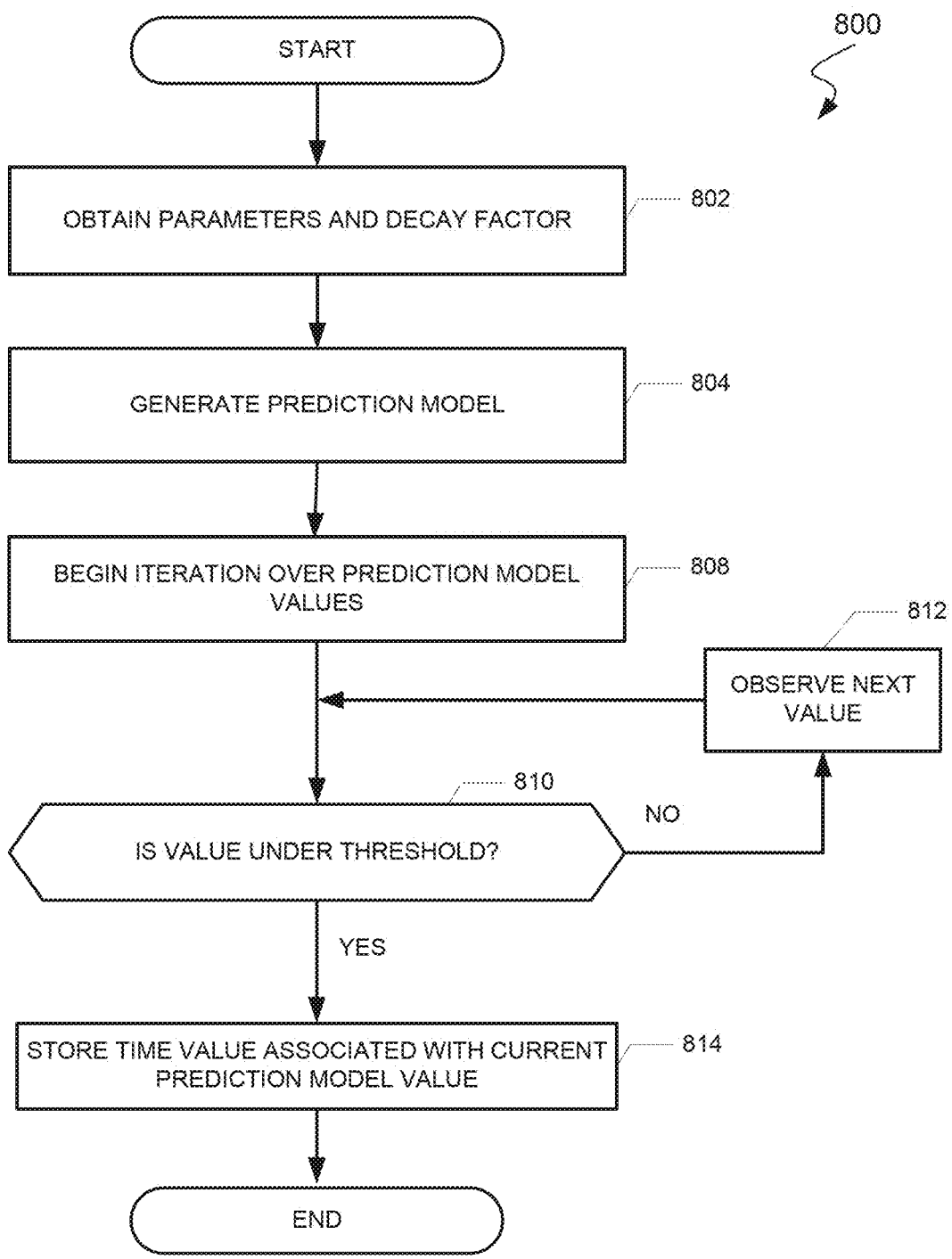
FIG. 8 is a flow diagram representative of example machine readable instructions that may be executed to implement the example predictor of FIG. 3 to generate a prediction model and forecast the predicted end time of streaming media.

An example flowchart representative of machine readable instructions that may be utilized to implement block 625 is illustrated in FIG. 8.

When the prediction model is generated, the example forecaster 314 iterates over the prediction model to determine a time at which a value of the prediction model falls below the threshold and returns the time as the predicted end of stream time for the streaming media (block 627). Once identified, the example forecaster 314 forwards the time to the example end of stream handler 316 for reporting (block 629). The time returned by the example end of stream handler 316 may be a timestamp of the predicted end time and/or an amount of time remaining for the streaming media presentation. Upon the reporting of the predicted end of stream time, control returns to block 602 where the example bandwidth recorder 304 continues monitoring bandwidth rates.

FIG. 7 is a flowchart 700 representing example machine readable instructions that may be executed to implement block 620 of FIG. 6 to calculate prediction model parameters. At block 708, the example parameter generator 310 determines parameters using the values of the primary dataset to generate a distribution model. For example, the example parameter generator 310 may calculate the mean, the standard deviation, the amplitude, and the variance of the metering dataset.

Next, the example parameter generator 310 identifies a decay factor associated with the characteristics of the streaming media (e.g., type, bit-rate, codec, carrier stream, etc.) for use in generating the example prediction model (block 710). For the example exponentially modified Gaussian function, this decay factor will be lambda of Equation 1, which determines the rate of decay. In some examples, the value used for lambda is identified based on the type of media being streamed (e.g., video and/or audio). In other examples, the value of lambda is dependent of the codec of media being streamed. For example, the example parameter generator 310 may cross reference the codec to a table having associated decay values (e.g., a flash video or ".flv" file). In other examples, the value of lambda is pre-configured before use of the example predictor 130.

At block 712, the generated parameters from block 708 and the identified decay factor from block 710 are stored for use by the example modeler 312 in the generation of the prediction model.

FIG. 8 is a flowchart 800 representing example machine readable instructions that may be executed to implement blocks 625 and 627 of FIG. 6 to predict an end of stream time. Beginning at block 802, the example modeler 312 obtains the parameters and decay factor from the example parameter generator 310. At block 804, the example modeler 312 uses the parameter and decay factor values to generate a prediction model. For example, the mean, the standard deviation, the amplitude, and decay factor calculated from the metering dataset are utilized in conjunction with Equation 1. Additionally, the time associated with each value in the metering dataset is inserted as the values for x in the example Equation 1, for example. Thus, utilizing the function of example Equation 1, the prediction model is generated based on the example exponentially modified Gaussian distribution.

At block 808, the example forecaster 314 of the illustrated example of FIG. 3 iterates over the prediction model generated in block 804 to determine a time at which a value of the prediction model falls below the threshold. The iterative process may iterate over the prediction model in pre-determined increments, or, in some examples, adjustable increments. For example, the iterations may be for a number of milliseconds. The example forecaster 314 begins the iteration using the identified mean value of the prediction model obtained from the generated parameters from block 708 of FIG. 7. As the prediction model begins to decay after the presence of a local peak, beginning the forecasting process at the mean value (e.g., the temporal location of the peak) allows for faster processing by not calculating the prediction values occurring before the peak.

Block 810 and block 812 of the illustrated example illustrate an iterative checking performed by the example forecaster 314. For example, if the value observed at block 810 is not below the threshold, the example forecaster 314 observes the next increment value (block 812) and returns to block 810. When the value observed at block 810 is at or below the threshold, the example forecaster 314 moves to block 814.

At block 814, the example forecaster 314 obtains the time value associated with the observed value that is at or below the threshold. In some examples, the example forecaster 314 stores this time value as the predicted end of stream time to predict an end of stream time for the streaming media based on the metering dataset. In some example, the forecaster 314 may additionally or alternatively calculate a predicted duration for the streaming media by subtracting the end of stream time from a media start time identified in information received by the example bandwidth recorder 304.

Figure 9:
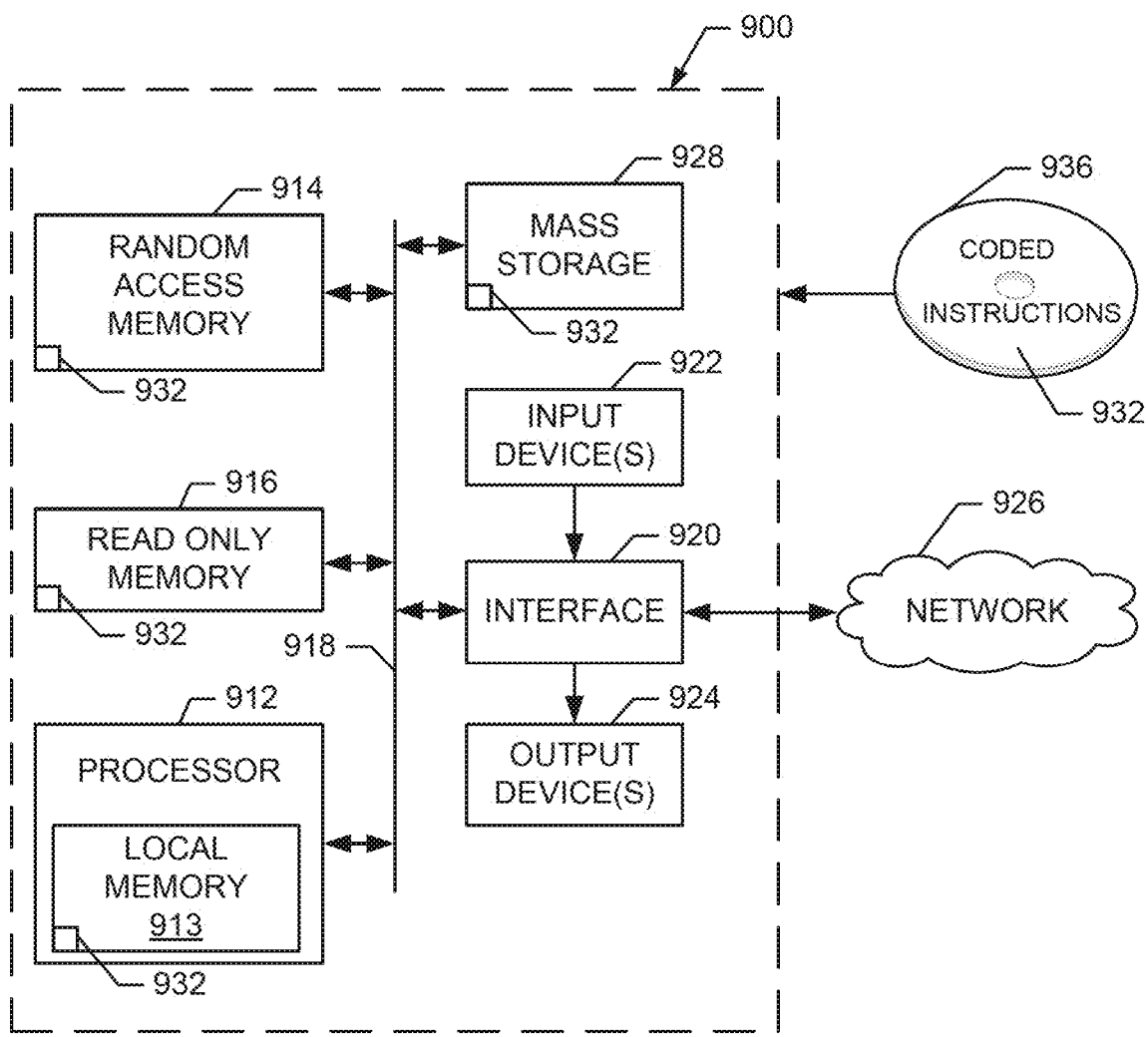
FIG. 9 is a block diagram of an example processor system that may execute any of the machine readable instructions represented by FIGS. 6, 7, and/or 8 to implement the example predictor of FIGS. 1 and/or 3.

FIG. 9 is a block diagram of an example processor platform 900 capable of executing the instructions of FIGS. 6, 7, and 8 to implement the predictor 130 of FIG. 3. The processor platform 900 can be, for example, a server, a personal computer, a mobile device (e.g., a cell phone, a smart phone, a tablet such as an iPad™), an Internet appliance, a digital video recorder, a smart TV, a smart Blu-ray player, a gaming console, a personal video recorder, a set top box, or any other type of computing device capable of streaming media.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit a user to enter data and commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 920 of the illustrated example, thus, typically includes a graphics driver card.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 6, 7, and 8 may be stored in the mass storage device 928, in the volatile memory 914, in the non-volatile memory 916, and/or on a removable tangible computer readable storage medium such as a CD or DVD.

From the foregoing, it will be appreciated that the above disclosed examples facilitate predicting an end time of streaming media using a prediction model. Additionally, the disclosed examples provide for the ability to forecast an end of stream time derived from the behavior of the traffic of the streaming media without having access to the streaming media application on the user device 101*a*-101*c*. In this way, it may be beneficial to audience measurement entities and/or data collection facilities to accurately predict the end of streaming media for targeted media delivery, more precise advertisement extraction of advertisement embedded in streaming media, presentation of user surveys, etc.

The disclosed examples also facilitate conservation of bandwidth in a monitored household. The disclosed examples may be used to send targeted media and/or surveys at a proper time so as not to interrupt streaming media. In a household with limited bandwidth, by predicting the end of streaming media, an audience measurement entity would not consume excess bandwidth by persistent querying to determine when to send targeted media and/or surveys.

The disclosed examples further facilitate conservation of system bandwidth. In examples where the proxy server sends characteristic information about the streaming media in lieu of mirroring the streaming media, required bandwidth is greatly reduced in contrast to mirroring methods. Such mirroring methods require the entirety of the streaming media to be mirrored to the audience measurement entity requiring bandwidth equal to that of the streaming media. Using the disclosed examples, the required bandwidth from the proxy server to the audience measurement entity is greatly reduced.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

The invention claimed is:

1. A computing system comprising:
   a processor, and
   memory having stored thereon machine-readable instructions that, when executed by the processor, cause performance of operations comprising:
   determining two or more characteristics of a bandwidth of a transmission of streaming media from a streaming media distributor to a media presentation device over a network during a streaming media session during which the streaming media is presented on the media presentation device, wherein the two or more characteristic comprise for more of an amplitude of a bandwidth associated with the transmission of the streaming media, a mean value of the bandwidth rate, or a variance of the bandwidth rate;
   generating a streaming duration prediction model using the two or more characteristics of the bandwidth, wherein the streaming duration prediction model is configured to predict an end time of the streaming media session; and
   identifying the end of the streaming media session based on the streaming duration prediction model.

2. The computing system of claim 1, wherein identifying the end of the streaming media session based on the streaming duration prediction model comprises identifying the end of the streaming media session based on an output of the streaming duration prediction model satisfying a threshold.

3. The computing system of claim 1, wherein determining the two or more characteristics comprises extracting, by a proxy server, data associated with the streaming media while the streaming media is being transmitted to the media presentation device, and wherein the data indicates the two or more characteristics.

4. The computing system of claim 1, wherein determining the two or more characteristics comprises receiving, over a network and from the media presentation device, data indicating the two or more characteristics.

5. The computing system of claim 1, wherein:
the streaming media comprises a video, and
the media presentation device comprises a smart television.

6. The computing system of claim 1, wherein the two one or more characteristics of the bandwidth further comprise se-standard deviation of the bandwidth rate.

7. The computing system of claim 1, wherein the streaming duration prediction model is further generated using an exponentially modified Gaussian distribution function.

8. A non-transitory computer-readable storage medium, having stored thereon machine-readable instructions that, when executed by a processor, cause performance of operations comprising:
determining two or more characteristics of a bandwidth of a transmission of streaming media from a streaming media distributor to a media presentation device over a network during a streaming media session during which the streaming media is presented on the media presentation device, wherein the two or more characteristics comprise two or more of an amplitude of a bandwidth rate associated with the transmission of the streaming media, a mean value of the bandwidth rate, or a variance of the bandwidth rate;
generating a streaming duration prediction model using the two or more characteristics of the bandwidth, wherein the streaming duration prediction model is configured to predict an end time of the streaming media session; and
identifying the end of the streaming media session based on the streaming duration prediction model.

9. The non-transitory computer-readable storage medium of claim 8, wherein identifying the end of the streaming media session based on the streaming duration prediction model comprises identifying the end of the streaming media session based on an output of the streaming duration prediction model satisfying a threshold.

10. The non-transitory computer-readable storage medium of claim 9, wherein the threshold is a minimum bandwidth threshold.

11. The non-transitory computer-readable storage medium of claim 8, wherein determining the two or more characteristics comprises extracting, by a proxy server, data associated with the streaming media while the streaming media is being transmitted to the media presentation device, and wherein the data indicates the two or more characteristics.

12. The non-transitory computer-readable storage medium of claim 8, wherein determining the two or more characteristics comprises receiving, over a network and from the media presentation device, data indicating the two or more characteristics.

13. The non-transitory computer-readable storage medium of claim 8, wherein:
the streaming media comprises a video, and
the media presentation device comprises a smart television.

14. The non-transitory computer-readable storage medium of claim 8, wherein the streaming duration prediction model is further generated using an exponentially modified Gaussian distribution function.

15. A method performed by a computing system comprising a processor, the method comprising:
determining two or more characteristics of a bandwidth of a transmission of streaming media from a streaming media distributor to a media presentation device over a network during a streaming media session during which the streaming media is presented on the media presentation device, wherein the two or more characteristics comprise two or more of an amplitude of a bandwidth rate associated with the transmission of the streaming media, a mean value of the bandwidth rate, or a variance of bandwidth rate
generating a streaming duration prediction model using the two or more characteristics of the bandwidth, wherein the streaming duration prediction model is configured to predict an end time of the streaming media session; and
identifying the end of the streaming media session based on the streaming duration prediction model.

16. The method of claim 15, wherein identifying the end of the streaming media session based on the streaming duration prediction model comprises identifying the end of the streaming media session based on an output of the streaming duration prediction model satisfying a threshold.

17. The method of claim 15, wherein determining the two or more characteristics comprises extracting, by a proxy server, data associated with the streaming media while the streaming media is being transmitted to the media presentation device, and wherein the data indicates the two or more characteristics.

18. The method of claim 15, wherein determining the two or more characteristics comprises receiving over a network and from the media presentation device, data indicating the two or more characteristics.

19. The method of claim 15, wherein:
the streaming media comprises a video, and
the media presentation device comprises a smart television.

20. The method of claim 15, wherein the streaming duration prediction model is further generated using an exponentially modified Gaussian distribution function.

* * * * *